United States Patent
Zack et al.

(10) Patent No.: US 12,547,543 B2
(45) Date of Patent: Feb. 10, 2026

(54) CACHE COHERENCY

(71) Applicant: Mellanox Technologies, Ltd., Yokneam (IL)

(72) Inventors: Yorai Itzhak Zack, Kiryat Ata (IL); Gal Shalom, Givat-Avni (IL); Aviad Shaul Yehezkel, Yokneam Ilit (IL); Eliav Bar-Ilan, Or Akiva (IL); Idan Zach, Givat Ela (IL); Oren Duer, Kohav Yair (IL); Vishwanath Venkatesan, Austin, TX (US); Omri Kahalon, Tel Aviv (IL)

(73) Assignee: Mellanox Technologies, Ltd., Yokneam (IL)

( * ) Notice: Subject to any disclaimer, the term of this patent is extended or adjusted under 35 U.S.C. 154(b) by 0 days.

(21) Appl. No.: 18/789,750

(22) Filed: Jul. 31, 2024

(65) Prior Publication Data

US 2026/0037446 A1 Feb. 5, 2026

(51) Int. Cl.
*G06F 12/0817* (2016.01)

(52) U.S. Cl.
CPC .... *G06F 12/0828* (2013.01); *G06F 2212/621* (2013.01)

(58) Field of Classification Search
CPC ...... G05B 13/00–048; G05B 15/00–02; G05B 17/00–02; G06F 1/00–3296; G06F 3/00; G06F 3/06–0689; G06F 5/00–16; G06F 8/00–78; G06F 9/00–548; G06F 11/00–3696; G06F 12/00–16; G06F 13/00–4295; G06F 15/00–825;
(Continued)

(56) References Cited

U.S. PATENT DOCUMENTS 5,003,465 A 3/1991 Chisholm et al.
5,463,772 A 10/1995 Thompson et al.
(Continued)

FOREIGN PATENT DOCUMENTS

EP 1657878 A1 5/2006
EP 2463782 A2 6/2012
WO 2010062679 A2 6/2010

OTHER PUBLICATIONS

AWS Storage Gateway; Amazon; Jun. 30, 2013; retrieved from https://docs.aws.amazon.com/filegateway/latest/files3/storagegateway-s3file-ug.pdf (Year: 2013).*

(Continued)

*Primary Examiner* — Daniel C. Chappell
(74) *Attorney, Agent, or Firm* — Meitar Patents Ltd.; Daniel Kligler (57) ABSTRACT

In one embodiment, a device includes a host interface to be connected to a host device via a data communication bus; and at least one processing core to expose a device emulation function to the host device, maintain a peripheral device cache, invalidate a cache entry in peripheral device cache in response to receiving a cache invalidation from a backend function, execute a translation function to translate between a format of the device emulation function and a format of the backend function, receive the cache invalidation from the backend function, translate the cache invalidation to the format of the device emulation function, and provide the translated cache invalidation function to the device emulation function being executed by a processor of the host device.

20 Claims, 4 Drawing Sheets

(58) Field of Classification Search
CPC ....... G06F 16/00–986; G06F 18/00–41; G06F 17/00–40; G06F 21/00–88; G06F 2009/3883; G06F 2009/45562–45595; G06F 2015/761–768; G06F 2201/00–885; G06F 2206/00–20; G06F 2209/00–549; G06F 2211/00–902; G06F 2212/00–7211; G06F 2213/00–4004; G06F 2216/00–17; G06F 2221/00–2153; G06N 3/00–126; G06N 5/00–048; G06N 7/00–08; G06N 10/00; G06N 20/00–20; G06N 99/00–007; G06T 1/00–60; G06V 30/00–43; G11B 20/00–24; G11B 33/00–1493; G11C 11/00–5692; G11C 13/00–06; G11C 14/00–009; G11C 15/00–06; G11C 16/00–3495; G11C 17/00–18; G11C 2207/00–229; G11C 2216/00–30; H01L 25/00–50; H01L 2225/00–1094; H03M 7/00–707; H04L 9/00–38; H04L 12/00–66; H04L 41/00–5096; H04L 49/00–9094; H04L 61/00–59; H04L 67/00–75

See application file for complete search history.

(56) References Cited

U.S. PATENT DOCUMENTS

| | | | |
|---|---|---|---|
| 5,615,404 A | 3/1997 | Knoll et al. | |
| 5,768,612 A | 6/1998 | Nelson | |
| 5,864,876 A | 1/1999 | Rossum et al. | |
| 5,893,166 A | 4/1999 | Frank et al. | |
| 5,954,802 A | 9/1999 | Griffith | |
| 6,070,219 A | 5/2000 | McAlpine et al. | |
| 6,226,680 B1 | 5/2001 | Boucher et al. | |
| 6,321,276 B1 | 11/2001 | Forin | |
| 6,581,130 B1 | 6/2003 | Brinkmann et al. | |
| 6,701,405 B1 | 3/2004 | Adusumilli et al. | |
| 6,766,467 B1 | 7/2004 | Neal et al. | |
| 6,789,143 B2 | 9/2004 | Craddock et al. | |
| 6,901,496 B1 | 5/2005 | Mukund et al. | |
| 6,981,027 B1 | 12/2005 | Gallo et al. | |
| 7,171,484 B1 | 1/2007 | Krause et al. | |
| 7,225,277 B2 | 5/2007 | Johns et al. | |
| 7,263,103 B2 | 8/2007 | Kagan et al. | |
| 7,299,266 B2 | 11/2007 | Boyd et al. | |
| 7,395,364 B2 | 7/2008 | Higuchi et al. | |
| 7,464,198 B2 | 12/2008 | Martinez et al. | |
| 7,475,398 B2 | 1/2009 | Nunoe | |
| 7,502,884 B1 | 3/2009 | Shah et al. | |
| 7,548,999 B2 | 6/2009 | Haertel et al. | |
| 7,577,773 B1 | 8/2009 | Gandhi et al. | |
| 7,657,659 B1 | 2/2010 | Lambeth et al. | |
| 7,720,064 B1 | 5/2010 | Rohde | |
| 7,752,417 B2 | 7/2010 | Manczak et al. | |
| 7,809,923 B2 | 10/2010 | Hummel et al. | |
| 7,921,178 B2 | 4/2011 | Haviv | |
| 7,921,237 B1 | 4/2011 | Holland et al. | |
| 7,945,752 B1 | 5/2011 | Miller et al. | |
| 8,001,592 B2 | 8/2011 | Hatakeyama | |
| 8,006,297 B2 | 8/2011 | Johnson et al. | |
| 8,010,763 B2 | 8/2011 | Armstrong et al. | |
| 8,051,212 B2 | 11/2011 | Kagan et al. | |
| 8,103,785 B2 | 1/2012 | Crowley et al. | |
| 8,255,475 B2 | 8/2012 | Kagan et al. | |
| 8,260,980 B2 | 9/2012 | Weber et al. | |
| 8,346,919 B1 | 1/2013 | Eiriksson et al. | |
| 8,447,904 B2 | 5/2013 | Riddoch | |
| 8,504,780 B2 | 8/2013 | Mine et al. | |
| 8,645,663 B2 | 2/2014 | Kagan et al. | |
| 8,745,276 B2 | 6/2014 | Bloch et al. | |
| 8,751,701 B2 | 6/2014 | Shahar et al. | |
| 8,824,492 B2 | 9/2014 | Wang et al. | |
| 8,892,804 B2 | 11/2014 | Morein et al. | |
| 8,949,486 B1 | 2/2015 | Kagan et al. | |
| 9,038,073 B2 | 5/2015 | Kohlenz et al. | |
| 9,043,560 B2 * | 5/2015 | Pruthi ................ | G06F 12/0842 718/1 |
| 9,092,426 B1 | 7/2015 | Bathija et al. | |
| 9,298,723 B1 | 3/2016 | Vincent | |
| 9,331,963 B2 | 5/2016 | Krishnamurthi et al. | |
| 9,483,290 B1 | 11/2016 | Mantri et al. | |
| 9,678,818 B2 | 6/2017 | Raikin et al. | |
| 9,696,942 B2 | 7/2017 | Kagan et al. | |
| 9,727,503 B2 | 8/2017 | Kagan et al. | |
| 9,830,082 B1 | 11/2017 | Srinivasan et al. | |
| 9,904,568 B2 | 2/2018 | Vincent et al. | |
| 10,078,613 B1 | 9/2018 | Ramey | |
| 10,095,620 B2 * | 10/2018 | Craddock ........... | G06F 12/0831 |
| 10,120,832 B2 | 11/2018 | Raindel et al. | |
| 10,135,739 B2 | 11/2018 | Raindel et al. | |
| 10,152,441 B2 | 12/2018 | Liss et al. | |
| 10,162,793 B1 | 12/2018 | Bshara et al. | |
| 10,210,125 B2 | 2/2019 | Burstein | |
| 10,218,645 B2 | 2/2019 | Raindel et al. | |
| 10,255,151 B1 | 4/2019 | Levin et al. | |
| 10,261,880 B1 | 4/2019 | Levin et al. | |
| 10,382,350 B2 | 8/2019 | Bohrer et al. | |
| 10,417,156 B2 | 9/2019 | Hsu et al. | |
| 10,423,774 B1 | 9/2019 | Zelenov et al. | |
| 10,607,141 B2 | 3/2020 | Jeram et al. | |
| 10,628,622 B1 | 4/2020 | Sivaraman et al. | |
| 10,657,077 B2 | 5/2020 | Ganor et al. | |
| 10,671,309 B1 | 6/2020 | Glynn | |
| 10,684,973 B2 | 6/2020 | Connor et al. | |
| 10,715,451 B2 | 7/2020 | Raindel et al. | |
| 10,824,469 B2 | 11/2020 | Hirshberg et al. | |
| 10,841,243 B2 | 11/2020 | Levi et al. | |
| 10,999,364 B1 | 5/2021 | Itigin et al. | |
| 11,003,607 B2 | 5/2021 | Ganor et al. | |
| 11,080,225 B2 | 8/2021 | Borikar et al. | |
| 11,086,713 B1 | 8/2021 | Sapuntzakis et al. | |
| 11,126,575 B1 | 9/2021 | Aslanidis et al. | |
| 11,409,685 B1 | 8/2022 | Kaplan et al. | |
| 11,537,548 B2 | 12/2022 | Makhija et al. | |
| 11,550,745 B1 | 1/2023 | Kelm | |
| 11,573,864 B1 | 2/2023 | Azmy Hassan et al. | |
| 11,899,599 B2 | 2/2024 | Weissmann et al. | |
| 12,007,921 B2 | 6/2024 | Marcovitch et al. | |
| 2002/0152327 A1 | 10/2002 | Kagan et al. | |
| 2003/0023846 A1 | 1/2003 | Krishna et al. | |
| 2003/0046530 A1 | 3/2003 | Poznanovic | |
| 2003/0120836 A1 | 6/2003 | Gordon | |
| 2003/0236929 A1 | 12/2003 | Nath | |
| 2004/0010612 A1 | 1/2004 | Pandya | |
| 2004/0039940 A1 | 2/2004 | Cox et al. | |
| 2004/0057434 A1 | 3/2004 | Poon et al. | |
| 2004/0158710 A1 | 8/2004 | Buer et al. | |
| 2004/0221128 A1 | 11/2004 | Beecroft et al. | |
| 2004/0230979 A1 | 11/2004 | Beecroft et al. | |
| 2005/0102497 A1 | 5/2005 | Buer | |
| 2005/0198412 A1 | 9/2005 | Pedersen et al. | |
| 2005/0216552 A1 | 9/2005 | Fineberg et al. | |
| 2006/0095754 A1 | 5/2006 | Hyder et al. | |
| 2006/0104308 A1 | 5/2006 | Pinkerton et al. | |
| 2006/0259291 A1 | 11/2006 | Dunham et al. | |
| 2006/0259661 A1 | 11/2006 | Feng et al. | |
| 2007/0011429 A1 | 1/2007 | Sangili et al. | |
| 2007/0061492 A1 | 3/2007 | van Riel | |
| 2007/0223472 A1 | 9/2007 | Tachibana et al. | |
| 2007/0226450 A1 | 9/2007 | Engbersen et al. | |
| 2007/0283124 A1 | 12/2007 | Menczak et al. | |
| 2007/0297453 A1 | 12/2007 | Niinomi | |
| 2008/0005387 A1 | 1/2008 | Mutaguchi | |
| 2008/0092148 A1 | 4/2008 | Moertl et al. | |
| 2008/0147822 A1 | 6/2008 | Benhase et al. | |
| 2008/0147904 A1 | 6/2008 | Freimuth et al. | |
| 2008/0168479 A1 | 7/2008 | Purtell et al. | |
| 2008/0313364 A1 | 12/2008 | Flynn et al. | |
| 2009/0086736 A1 | 4/2009 | Foong et al. | |
| 2009/0106771 A1 | 4/2009 | Benner et al. | |
| 2009/0204650 A1 | 8/2009 | Wong et al. | |
| 2009/0319775 A1 | 12/2009 | Buer et al. | |

(56) References Cited

U.S. PATENT DOCUMENTS

| | | |
|---|---|---|
| 2009/0328170 A1 | 12/2009 | Williams et al. |
| 2010/0030975 A1 | 2/2010 | Murray et al. |
| 2010/0095053 A1 | 4/2010 | Bruce et al. |
| 2010/0095085 A1 | 4/2010 | Hummel et al. |
| 2010/0211834 A1 | 8/2010 | Asnaashari et al. |
| 2010/0217916 A1 | 8/2010 | Gao et al. |
| 2010/0228962 A1 | 9/2010 | Simon et al. |
| 2010/0322265 A1 | 12/2010 | Gopinath et al. |
| 2011/0023027 A1 | 1/2011 | Kegel et al. |
| 2011/0055469 A1 | 3/2011 | Natu et al. |
| 2011/0119673 A1 | 5/2011 | Bloch et al. |
| 2011/0213854 A1 | 9/2011 | Haviv |
| 2011/0246597 A1 | 10/2011 | Swanson et al. |
| 2012/0314709 A1 | 12/2012 | Post et al. |
| 2013/0067193 A1 | 3/2013 | Kagan et al. |
| 2013/0080651 A1 | 3/2013 | Pope et al. |
| 2013/0103777 A1 | 4/2013 | Kagan et al. |
| 2013/0125125 A1 | 5/2013 | Karino et al. |
| 2013/0142205 A1 | 6/2013 | Munoz |
| 2013/0145035 A1 | 6/2013 | Pope et al. |
| 2013/0159568 A1 | 6/2013 | Shahar et al. |
| 2013/0205028 A1* | 8/2013 | Crockett ............... G06F 9/5066 709/226 |
| 2013/0263247 A1 | 10/2013 | Jungck et al. |
| 2013/0276133 A1 | 10/2013 | Hodges et al. |
| 2013/0311746 A1 | 11/2013 | Raindel et al. |
| 2013/0325998 A1 | 12/2013 | Hormuth et al. |
| 2013/0329557 A1 | 12/2013 | Petry |
| 2013/0347110 A1 | 12/2013 | Dalal |
| 2014/0059368 A1 | 2/2014 | Kumar et al. |
| 2014/0089450 A1 | 3/2014 | Raindel et al. |
| 2014/0089451 A1 | 3/2014 | Eran et al. |
| 2014/0089631 A1 | 3/2014 | King |
| 2014/0122828 A1 | 5/2014 | Kagan et al. |
| 2014/0129741 A1 | 5/2014 | Shahar et al. |
| 2014/0156894 A1 | 6/2014 | Tsirkin et al. |
| 2014/0181365 A1 | 6/2014 | Fanning et al. |
| 2014/0185616 A1 | 7/2014 | Bloch et al. |
| 2014/0244965 A1 | 8/2014 | Manula et al. |
| 2014/0254593 A1 | 9/2014 | Mital et al. |
| 2014/0282050 A1 | 9/2014 | Quinn et al. |
| 2014/0282561 A1 | 9/2014 | Holt et al. |
| 2015/0006663 A1 | 1/2015 | Huang |
| 2015/0012735 A1 | 1/2015 | Tamir et al. |
| 2015/0032835 A1 | 1/2015 | Sharp et al. |
| 2015/0081947 A1 | 3/2015 | Vucinic et al. |
| 2015/0100962 A1 | 4/2015 | Morita et al. |
| 2015/0288624 A1 | 10/2015 | Raindel et al. |
| 2015/0319243 A1 | 11/2015 | Hussain et al. |
| 2015/0347185 A1 | 12/2015 | Holt et al. |
| 2015/0355938 A1 | 12/2015 | Jokinen et al. |
| 2016/0065659 A1 | 3/2016 | Bloch et al. |
| 2016/0085718 A1 | 3/2016 | Huang |
| 2016/0132329 A1 | 5/2016 | Gupte et al. |
| 2016/0154673 A1 | 6/2016 | Morris |
| 2016/0182309 A1* | 6/2016 | Maturana ......... G05B 19/41885 709/224 |
| 2016/0226822 A1 | 8/2016 | Zhang et al. |
| 2016/0342547 A1 | 11/2016 | Liss et al. |
| 2016/0350151 A1 | 12/2016 | Zou et al. |
| 2016/0378529 A1 | 12/2016 | Wen |
| 2017/0031810 A1 | 2/2017 | Bonzini et al. |
| 2017/0075855 A1 | 3/2017 | Sajeepa et al. |
| 2017/0104828 A1 | 4/2017 | Brown et al. |
| 2017/0180273 A1 | 6/2017 | Daly et al. |
| 2017/0187629 A1 | 6/2017 | Shalev et al. |
| 2017/0237672 A1 | 8/2017 | Dalal |
| 2017/0264622 A1 | 9/2017 | Cooper et al. |
| 2017/0286157 A1 | 10/2017 | Hasting et al. |
| 2017/0371835 A1 | 12/2017 | Ranadive et al. |
| 2018/0004954 A1 | 1/2018 | Liguori et al. |
| 2018/0067893 A1 | 3/2018 | Raindel et al. |
| 2018/0109471 A1 | 4/2018 | Chang et al. |
| 2018/0114013 A1 | 4/2018 | Sood et al. |
| 2018/0167364 A1 | 6/2018 | Dong et al. |
| 2018/0210751 A1 | 7/2018 | Pepus et al. |
| 2018/0219770 A1 | 8/2018 | Wu et al. |
| 2018/0219772 A1 | 8/2018 | Koster et al. |
| 2018/0246768 A1 | 8/2018 | Palermo et al. |
| 2018/0262468 A1 | 9/2018 | Kumar et al. |
| 2018/0285288 A1 | 10/2018 | Bernat et al. |
| 2018/0329828 A1 | 11/2018 | Apfelbaum et al. |
| 2019/0012350 A1 | 1/2019 | Sindhu et al. |
| 2019/0026157 A1 | 1/2019 | Suzuki et al. |
| 2019/0116127 A1 | 4/2019 | Pismenny et al. |
| 2019/0124113 A1 | 4/2019 | Labana et al. |
| 2019/0163364 A1 | 5/2019 | Gibb et al. |
| 2019/0173846 A1 | 6/2019 | Patterson et al. |
| 2019/0190892 A1 | 6/2019 | Menachem et al. |
| 2019/0199690 A1 | 6/2019 | Klein |
| 2019/0243781 A1 | 8/2019 | Thyamagondlu et al. |
| 2019/0250938 A1 | 8/2019 | Claes et al. |
| 2020/0012604 A1 | 1/2020 | Agarwal |
| 2020/0026656 A1 | 1/2020 | Liao et al. |
| 2020/0065269 A1 | 2/2020 | Balasubramani et al. |
| 2020/0259803 A1 | 8/2020 | Menachem et al. |
| 2020/0314181 A1 | 10/2020 | Eran et al. |
| 2020/0401440 A1 | 12/2020 | Sankaran et al. |
| 2021/0042255 A1 | 2/2021 | Colenbrander |
| 2021/0111996 A1 | 4/2021 | Pismenny et al. |
| 2021/0133140 A1 | 5/2021 | Jeansonne et al. |
| 2021/0203610 A1 | 7/2021 | Pismenny et al. |
| 2021/0209052 A1 | 7/2021 | Chen et al. |
| 2021/0377338 A1* | 12/2021 | Pannem .................. H04L 41/40 |
| 2022/0075747 A1 | 3/2022 | Shuler et al. |
| 2022/0092135 A1 | 3/2022 | Sidman |
| 2022/0100687 A1 | 3/2022 | Sahin et al. |
| 2022/0103629 A1 | 3/2022 | Cherian et al. |
| 2022/0283964 A1 | 9/2022 | Burstein et al. |
| 2022/0308764 A1 | 9/2022 | Pismenny et al. |
| 2022/0309019 A1 | 9/2022 | Duer et al. |
| 2022/0334989 A1 | 10/2022 | Bar-Llan et al. |
| 2022/0391341 A1 | 12/2022 | Rosenbaum et al. |
| 2023/0010150 A1 | 1/2023 | Ben-Ishay et al. |
| 2023/0315659 A1 | 10/2023 | Marcovitch et al. |
| 2024/0143526 A1 | 5/2024 | Liss et al. |

OTHER PUBLICATIONS

Nvidia BLUEFIELD-2 DPU; Nvidia; Feb. 26, 2022; retrieved from https://web.archive.org/web/20220226185025/https://www.nvidia.com/content/dam/en-zz/Solutions/Data-Center/documents/datasheet-nvidia-bluefield-2-dpu.pdf (Year: 2022).*
C. Li, D. Feng, Y. Hua, F. Wang, C. Jiang and W. Zhou, "A Log-aware Synergized scheme for p. level FTL design," Design, Automation & Test in Europe Conference & Exhibition (DATE), 2017, Lausanne, Switzerland, 2017, pp. 1080-1085, doi: 10.23919/DATE.2017.7927150. (Year: 2017).*
US Office Action U.S. Appl. No. 17/987,904 dated Mar. 20, 2025.
Shirey, "Internet Security Glossary, Version 2", Request for Comments 4949, pp. 1-365, Aug. 2007.
Information Sciences Institute, "Transmission Control Protocol; DARPA Internet Program Protocol Specification", Request for Comments 793, pp. 1-90, Sep. 1981.
InfiniBand TM Architecture Specification vol. 1, Release 1.3, pp. 1-1842, Mar. 3, 2015.
Stevens., "TCP Slow Start, Congestion Avoidance, Fast Retransmit, and Fast Recovery Algorithms", Request for Comments 2001, pp. 1-6, Jan. 1997.
Netronome Systems, Inc., "Open vSwitch Offload and Acceleration with Agilio® CX SmartNICs", White Paper, pp. 1-7, Mar. 2017.
PCI Express® Base Specification, Revision 3.0, pp. 1-860, Nov. 10, 2010.
Dierks et al., "The Transport Layer Security (TLS) Protocol Version 1.2", Request for Comments: 5246, pp. 1-104, Aug. 2008.
Turner et al., "Prohibiting Secure Sockets Layer (SSL) Version 2.0", Request for Comments: 6176, pp. 1-4, Mar. 2011.
Rescorla et al., "The Transport Layer Security (TLS) Protocol Version 1.3", Request for Comments: 8446, pp. 1-160, Aug. 2018.

(56) References Cited

OTHER PUBLICATIONS

COMER., "Packet Classification: A Faster, More General Alternative to Demultiplexing", The Internet Protocol Journal, vol. 15, No. 4, pp. 12-22, Dec. 2012.
Salowey et al., "AES Galois Counter Mode (GCM) Cipher Suites for TLS", Request for Comments: 5288, pp. 1-8, Aug. 2008.
Burstein, "Enabling Remote Persistent Memory", SNIA-PM Summit, pp. 1-24, Jan. 24, 2019.
Chung et al., "Serving DNNs in Real Time at Datacenter Scale with Project Brainwave", IEEE Micro Pre-Print, pp. 1-11, Mar. 22, 2018.
Talpey, "Remote Persistent Memory—With Nothing But Net", SNIA-Storage developer conference , pp. 1-30, year 2017.
Microsoft, "Project Brainwave", pp. 1-5, year 2019.
"NVM Express—Base Specifications," Revision 2.0, pp. 1-452, May 13, 2021.
Pismenny et al., "Autonomous NIC Offloads", submitted for evaluation of the 26th International Conference on Architectural Support for Programming Languages and Operating Systems (ASPLOS '21), p. 1-18, Dec. 13, 2020.
Lebeane et al., "Extended Task queuing: Active Messages for Heterogeneous Systems", Proceedings of the International Conference for High Performance Computing, Networking, Storage and Analysis (SC'16), pp. 933-944, Nov. 2016.
NVM Express Inc., "NVM Express over Fabrics," Revision 1.0, pp. 1-49, Jun. 5, 2016.
U.S. Appl. No. 17/987,904 Office Action dated Oct. 31, 2024.
U.S. Appl. No. 18/655,386 Office Action dated Nov. 18, 2024.
"Switchtec PAX Gen 4 Advanced Fabric PCIe Switch Family—PM42100, PM42068, PM42052, PM42036, PM42028," Product Brochure, Microchip Technology Incorporated, pp. 1-2, year 2021.
Regula, "Using Non-Transparent Bridging in PCI Express Systems," PLX Technology, Inc., pp. 1-31, Jun. 2004.
Mellanox Technologies, "Understanding on Demand Paging (ODP)," Knowledge Article, pp. 1-6, Feb. 20, 2019 3 downloaded from https://community.mellanox.com/s/article/understanding-on-demand-paging--odp-x.
"Linux kernel enable the IOMMU—input/output memory management unit support", pp. 1-2, Oct. 15, 2007 downloaded from http://www.cyberciti.biz/tips/howto-turn-on-linux-software-iommu-support.html.
Hummel M., "IO Memory Management Hardware Goes Mainstream", AMD Fellow, Computation Products Group, Microsoft WinHEC, pp. 1-7, 2006.
NVM Express, Revision 1.0e, pp. 1-127, Jan. 23, 2013.
Infiniband Trade Association, "InfiniBandTM Architecture Specification", vol. 1, Release 1.2.1, pp. 1-1727, Nov. 2007.
Shah et al., "Direct Data Placement over Reliable Transports", IETF Network Working Group, RFC 5041, pp. 1-38, Oct. 2007.
Culley et al., "Marker PDU Aligned Framing for TCP Specification", IETF Network Working Group, RFC 5044, pp. 1-75, Oct. 2007.
"MPI: A Message-Passing Interface Standard", Version 2.2, Message Passing Interface Forum, pp. 1-64, Sep. 4, 2009.
Welsh et al., "Incorporating Memory Management into User-Level Network Interfaces", Department of Computer Science, Cornell University, Technical Report TR97-1620, pp. 1-10, Feb. 13, 1997.
Tsirkin et al., "Virtual I/O Device (VIRTIO) Version 1.1", Committee Specification Draft 01/Public Review Draft 01, OASIS Open, pp. 1-121, Dec. 20, 2018.
Arm Limited, "Microprocessor Cores and Processor Technology—Arm®—Processor IP for the Widest Range of Devices," Product Information, pp. 1-6, years 1995-2024, as downloaded from https://www.arm.com/products/silicon-ip-cpu.

\* cited by examiner

Fig. 1

CACHE COHERENCY

FIELD OF THE DISCLOSURE

The present disclosure relates to computer systems, and in particular, but not exclusively to, cache coherency with device emulation.

BACKGROUND

A host device may be connected to a peripheral device such as a data processing unit (DPU), which is connected to a network. The DPU may include multiple processing cores and a network interface controller (NIC). The DPU and host device may be connected via a suitable data communication bus operating according to any suitable protocol, for example, Peripheral Component Interconnect Express (PCIe). Without using device emulation, the NIC may expose a physical function (PF) on the host device side of the PCIe. The PF allows the host device to communicate with the network without the host device knowing what is occurring in the NIC.

With device emulation, the NIC exposes a virtual device emulation function (e.g., VirtioNet) to the host device, which allows the host device to communicate with the network. A translation layer or function is also used to translate between the format of the device emulation function and the format of the NIC. In this manner, in some implementations the NIC may be replaced with a new, different type, of NIC, and the host device may still communicate with the network via the new NIC using a suitable translation layer and optionally suitable device emulation function.

Device emulation may be used to allow a virtual machine (VM) running on the host device to communicate with the network. Device emulation may be implemented using different methods. Some implementations provide low latency, but the device emulation functions are hardware specific. Other implementations are hardware independent but suffer from latency issues, for example, when the translation layer is disposed in the host device.

Some device emulation implementations provide hardware independent functionality with improved latency by running the translation layer on the DPU. For example, the DPU runs a VirtioNet to NetFunction translation layer, while VirtioNet is run by the hypervisor and each VM run by the hypervisor.

Another example of device emulation is file system device emulation, in which the host device (e.g., a VM running on the host device) accesses one or more file systems using a file system device emulation function (e.g., VirtioFS) running on the VM. The DPU may then run a translation function between the file system device emulation function and the file system. The VM may see a simple representation of the file system, while the logic to access the file system is implemented in the DPU. For example, the DPU emulates the file system by exposing VirtioFS to the host device, the host device issues input-output (I/O) requests to VirtioFS, and the DPU transfers data using VirtQueues.

OVERVIEW

There is provided in accordance with an embodiment of the present disclosure, a device, including a host interface to be connected to a host device via a data communication bus, and at least one processing core to expose a device emulation function to the host device, maintain a peripheral device cache, invalidate a cache entry in peripheral device cache in response to receiving a cache invalidation from a backend function, execute a translation function to translate between a format of the device emulation function and a format of the backend function, receive the cache invalidation from the backend function, translate the cache invalidation to the format of the device emulation function, and provide the translated cache invalidation function to the device emulation function being executed by a processor of the host device.

Further in accordance with an embodiment of the present disclosure the device emulation function is a file system device emulation function, the backend function is a file system, and the translation function is to translate between a format of the file system device emulation function and a format of the file system.

Still further in accordance with an embodiment of the present disclosure the file system is a local file system, and is executed by the peripheral device.

Additionally in accordance with an embodiment of the present disclosure the device emulation function is a block storage system device emulation function, the backend function is a block storage system, and the translation function is to translate between a format of the block storage system device emulation function and a format of the block storage system.

Moreover, in accordance with an embodiment of the present disclosure the translation function is to provide the translated cache invalidation to a notification queue disposed on the host device.

Further in accordance with an embodiment of the present disclosure, the device includes a data processing unit (DPU) including the at least one processing core and a network interface controller (NIC).

There is also provided in accordance with another embodiment of the present disclosure, a system, including a host device and a peripheral device, the host device including a processor, the peripheral device including a host interface to be connected to a host device via a data communication bus, and at least one processing core to expose a device emulation function to the host device, maintain a peripheral device cache, and invalidate a cache entry in peripheral device cache in response to receiving a cache invalidation from a backend function, execute a translation function to translate between a format of the device emulation function and a format of the backend function, receive the cache invalidation from the backend function, translate the cache invalidation to the format of the device emulation function, and provide the translated cache invalidation to the device emulation function being executed by the processor of the host device.

Still further in accordance with an embodiment of the present disclosure the device emulation function is a file system device emulation function, the backend function is a file system, and the translation function is to translate between a format of the file system device emulation function and a format of the file system.

Additionally in accordance with an embodiment of the present disclosure the file system is a local file system, and is executed by the peripheral device.

Moreover, in accordance with an embodiment of the present disclosure the device emulation function is a block storage system device emulation function, the backend function is a block storage system, and the translation function is to translate between a format of the block storage system device emulation function and a format of the block storage system.

Further in accordance with an embodiment of the present disclosure the processor is to execute the device emulation function, the processor is to maintain a host cache, and the device emulation function is to receive the translated cache invalidation and provide a command to invalidate a cache entry in the host cache based on the received translated cache invalidation.

Still further in accordance with an embodiment of the present disclosure the translation function is to provide the translated cache invalidation to a notification queue disposed on the host device, and the device emulation function is to read the translated cache invalidation from the notification queue.

Additionally in accordance with an embodiment of the present disclosure the processor of the host device is to execute a hypervisor, and the hypervisor is to execute a virtual machine (VM), which is to execute the device emulation function.

Moreover, in accordance with an embodiment of the present disclosure the device emulation function is a file system device emulation function, the backend function is a file system, and the translation function is to translate between a format of the file system device emulation function and a format of the file system.

Further in accordance with an embodiment of the present disclosure the peripheral device includes a data processing unit (DPU), including the at least one processing core and a network interface controller (NIC).

There is also provided in accordance with still another embodiment of the present disclosure, a method, including exposing a device emulation function to a host device, maintaining a peripheral device cache, invalidating a cache entry in peripheral device cache in response to receiving a cache invalidation from a backend function, translating between a format of the device emulation function and a format of the backend function, receiving the cache invalidation from the backend function, translating the cache invalidation to the format of the device emulation function, and providing the translated cache invalidation to the device emulation function being executed by a processor of the host device.

Still further in accordance with an embodiment of the present disclosure the device emulation function is a file system device emulation function, the backend function is a file system, and the method further includes translating between a format of the file system device emulation function and a format of the file system.

Additionally in accordance with an embodiment of the present disclosure the device emulation function is a block storage system device emulation function, the backend function is a block storage system, and the method further includes translating between a format of the block storage system device emulation function and a format of the block storage system.

Moreover, in accordance with an embodiment of the present disclosure, the method includes executing the device emulation function in the host device, maintaining a host cache, receiving the translated cache invalidation, and providing a command to invalidate a cache entry in the host cache based on the received translated cache invalidation.

Further in accordance with an embodiment of the present disclosure, the method includes providing the translated cache invalidation to a notification queue disposed on the host device, and reading the translated cache invalidation from the notification queue.

BRIEF DESCRIPTION OF THE DRAWINGS

The present disclosure will be understood from the following detailed description, taken in conjunction with the drawings in which.

DESCRIPTION OF EXAMPLE EMBODIMENTS

Overview of Example Embodiments

A distributed file system generally guarantees user cache coherency so that when a user reads from the cache, the user is guaranteed that it reads the most up to data values. For example, one of the most common HPC File Systems is Lustre, a POSIX-compliant, distributed parallel file system designed for scalability, high-performance, and high-availability. Lustre runs on Linux-based operating systems and employs a client-server network architecture as a filesystem. The Lustre software stack includes different layers that handle file I/O operations, provide a smart locking mechanism that guarantees coherency on the client's cache, and distributes the file mechanism, among other features.

Cache coherency issues may occur when a file system is presented as a local device to the host device, but the file system backend is also part of a distributed file system that the host device is unaware of. A peripheral device is connected to the host device. A local driver of peripheral device running in the host device may store data in a local cache, and then that data may be updated by a different host (or different VM) on a remote server. A peripheral device of the host device expects that the local driver is the source of all the requests, therefore the peripheral device does not notify the host device about cache invalidation updates.

For example, in a system using device emulation such as where DPU-A exposes a file system (FS) device emulation function to a host device (e.g., to VM-A running on the host device), DPU-A may include a translation function to translate between the device emulation function and the file system. The host and/or VM-A may operate an FS cache, and the DPU-A may operate an FS cache. When the FS caches are not synchronized, if VM-B or another host accesses a file cached by VM-A, the cache of VM-A will not be up to date. For example, if VM-B updates file X, and sends a write request for file X to the FS backend, the FS backend should send an invalidation for file X to all the relevant caches so that file X is removed from the relevant caches (including the cache of VM-A). However, due to the virtualization of the file system, the invalidation for file X does not reach VM-A and therefore VM-A will not see the update as it thinks it has the latest version of file X in its cache. VM-A will not see the update until file X is removed from the cache for another reason, e.g., cache is full.

The current solution for an application that wants to use a coherent FS is to skip over the cache using O_DIRECT for example. However, this results in a performance hit as the cache is there for a reason, which is in order to improve performance.

Therefore, embodiments of the present disclosure address some of the above drawbacks by creating a channel from a peripheral device (e.g., DPU such as DPU-A) to a host device (e.g., to a VM, such as VM-A, running on the host device) to provide a cache invalidation received from a backend function (e.g., file system or block storage system) to the host device (e.g., to VM-A) to invalidate the cache maintained by the host device thereby providing improved performance of the host device and the various I/O mechanisms.

In some embodiments, a cache invalidation is received by a translation function running in the peripheral device from the backend function (e.g., file system client or block storage system). The backend function operates a system such as the file system or block storage system, or any suitable system. The translation function translates the cache invalidation from a format of the backend function (e.g., of the file system or block storage system) to a format of the device emulation function (e.g., VirtioFS) running on the host device. The translation function provides the translated cache invalidation to the device emulation function, for example, via a notification queue managed by the device emulation function, which is executed by the host device or by a hypervisor run by the host device. The device emulation function (e.g., running on a VM in the host device) may read the translated cache invalidation (e.g., from the queue) and invalidate the relevant cache entry in the host cache by sending a suitable command to a function managing the cache. The host device may acknowledge the cache invalidation. The channel may operate in synchronous or asynchronous mode, and the invalidation request may comply with the FUST_NOTIFY_INVAL_INODE and FUSE_NOTIFY_INVAL_ENTRY formats for example.

System Description

Figure 1:
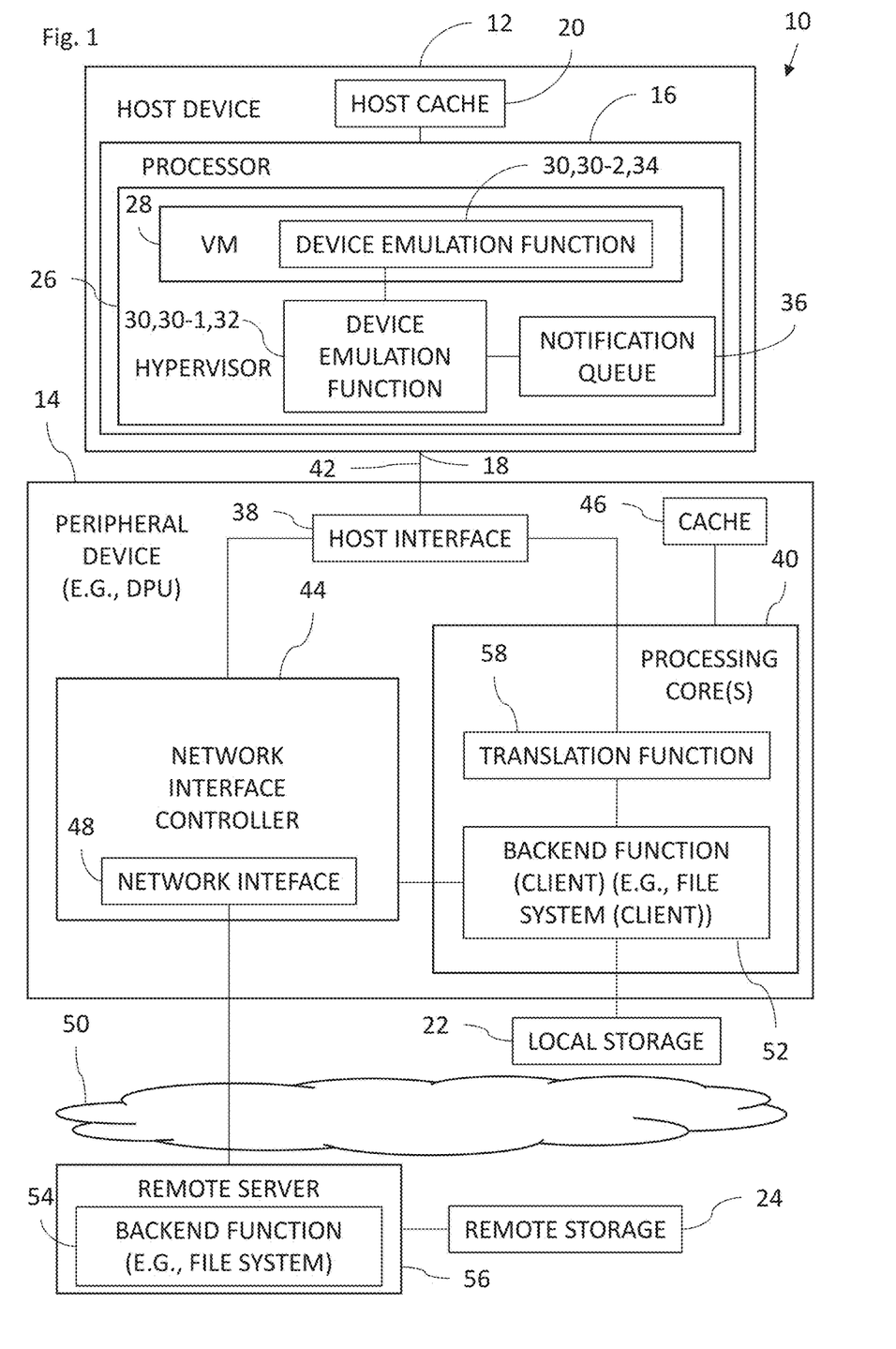
FIG. 1 is a block diagram view of a computer system constructed and operative in accordance with an embodiment of the present disclosure.

Reference is now made to FIG. 1, which is a block diagram view of a computer system 10 constructed and operative in accordance with an embodiment of the present disclosure. The system 10 includes a host device 12 and a peripheral device 14.

The host device 12 includes a processor 16, an interface 18 with the peripheral device 14, and a host cache 20. The host cache 20 is configured to store data used by the processor 16, for example, data read from local storage 22 or remote storage 24, described in more detail below. The processor 16 may be a general-purpose processor such as a central processing unit (CPU) or any suitable processing unit. In some embodiments, the processor 16 is configured to execute a hypervisor 26, which is configured to execute one or more virtual machines (VMs) 28. For the sake of simplicity, FIG. 1 shows a single VM 28. As will be described in more detail below, in order to enable device emulation, the peripheral device 14 may expose a device emulation function 30 to the host device 12. In some embodiments, the hypervisor 26 is configured to execute an instance 30-1 of device emulation function 30 (also referred herein as device emulation function 32), and each VM 28 is configured to execute its own instance 30-2 of device emulation function 30 (also reference herein as device emulation function 34), such that different device emulation functions 34 are executed by different VMs 28. The device emulation function 32 is configured to maintain a notification queue 36, described in more detail with reference to FIGS. 2-4. The notification queue may be any suitable queue used to queue notification messages and is not limited to any given protocol. The processor 16 and/or the VM 28 may execute a client program which reads data from, and/or writes data to, the local storage 22 and/or the remote storage 24 via the device emulation function 30. In some embodiments, device emulation function 30 is a file system device emulation function (e.g., VirtioFS) or a block storage system device emulation function (e.g., VirtioBLOCK), or any suitable device emulation function 30.

In practice, some or all of these functions of the processor 16 may be combined in a single physical component or, alternatively, implemented using multiple physical components. These physical components may comprise hard-wired or programmable devices, or a combination of the two. In some embodiments, at least some of the functions of the processor 16 may be carried out by a programmable processor under the control of suitable software. This software may be downloaded to a device in electronic form, over a network, for example. Alternatively, or additionally, the software may be stored in tangible, non-transitory computer-readable storage media, such as optical, magnetic, or electronic memory.

The peripheral device 14 includes a host interface 38, one or more processing cores 40 (e.g., one or more Reduced Instruction Set Computer (RISC) for example ARM cores commercially available from ARM Holding PLC, Cambridge, England, UK), and a peripheral device cache 46 for use by the processing cores 40, for example, to cache data read from local storage 22 and/or remote storage 24. The host interface 38 is configured to be connected to host device 12 via a data communication bus 42 using any suitable protocol such as PCIe. In some embodiments, the peripheral device 14 is, or includes, a data processing unit (DPU), which includes the host interface 38, the processing cores 40, and network interface controller (NIC) 44. The NIC 44 may include any suitable circuits, for example, but not limited to, a physical layer (PHY) chip (not shown) and a MAC chip (not shown). The NIC 44 may also include a network interface 48 including ports (not shown) to connect the peripheral device 14 to other devices over a network 50.

The processing core(s) 40 is configured to execute a backend function and/or a backend function (client) 52. When the processing core(s) 40 is configured to execute a backend function client 52, the client 52 communicates with another backend function 54 executed on a remote server 56. The backend function 54 may correspond to any suitable backend function, such as a file system (FS) or block storage system. For example, the backend function client 52 may be a file system client to communicate over network 50 with the backend function 54 (which is a remote file system), and the backend function 54 is configured to read data from, and write data to, remote storage 24.

When the processing core(s) 40 is configured to execute a backend function 52, the backend function 52 may correspond to any suitable backend function, such as a local file system (FS) or local block storage system. For example, the backend function 52 may be a local file system configured to read data from, and write data to, local storage 22.

The system 10 may include one or more local file systems and/or one or more remote file systems controlled via one or more remote servers. The client program executed by the processor 16 of the host device 12 may read data from, and/or write data to, virtual storage which may map to the local storage 22 and/or the remote storage 24 or any other storage medium local to peripheral device 14 or across network 50. The host device 12 (including the VM 28) does not have knowledge of the various physical storage mediums. The VM 28 "thinks" all the storage is local and "thinks" that all the storage is accessible via the device emulation function 34 run by VM 28. VM 28 reads and/or writes to storage via device emulation function 34 and does not have knowledge of the file system even if it is local or remote. The backend function (client) 52 determines where to store data (e.g. locally or remotely) and other storage parameters.

It should be noted that one or more other VMs 28 running on host device 12 or other host devices in system 10 may also share local storage 22 and/or remote storage 24, as applicable. An orchestrator (not shown) may determine how all the file storage is set up for system 10. The advantage of the above is that a system administrator of system 10 may enforce storage policies which are not visible to the host device 12 (and other host devices) or hypervisors in the system 10.

In some embodiments, the processing core(s) 40 may execute more than one backend function 52 (e.g., file systems with associated local storage devices) and/or more than one backend function client 52 (e.g., file system clients with associated remote storage devices), and the device emulation function 34 may communicate with the multiple backend function (client) s 52.

In some embodiments, the above functionality may be implemented on the host device 12 without using any VMs such that the device emulation function 30 is executed by the processor 16 without using a hypervisor, for example.

The processing core(s) 40 is also configured to execute a translation function 58 configured to translate between a format of the backend function (e.g., file system or block storage system) and a format of the device emulation function 30, as described in more detail with reference to FIG. 2.

In practice, some or all of these functions of the processing core(s) 40 may be combined in a single physical component or, alternatively, implemented using multiple physical components. These physical components may comprise hard-wired or programmable devices, or a combination of the two. In some embodiments, at least some of the functions of the processing core(s) 40 may be carried out by a programmable processor under the control of suitable software. This software may be downloaded to a device in electronic form, over a network, for example. Alternatively, or additionally, the software may be stored in tangible, non-transitory computer-readable storage media, such as optical, magnetic, or electronic memory.

Figure 2:
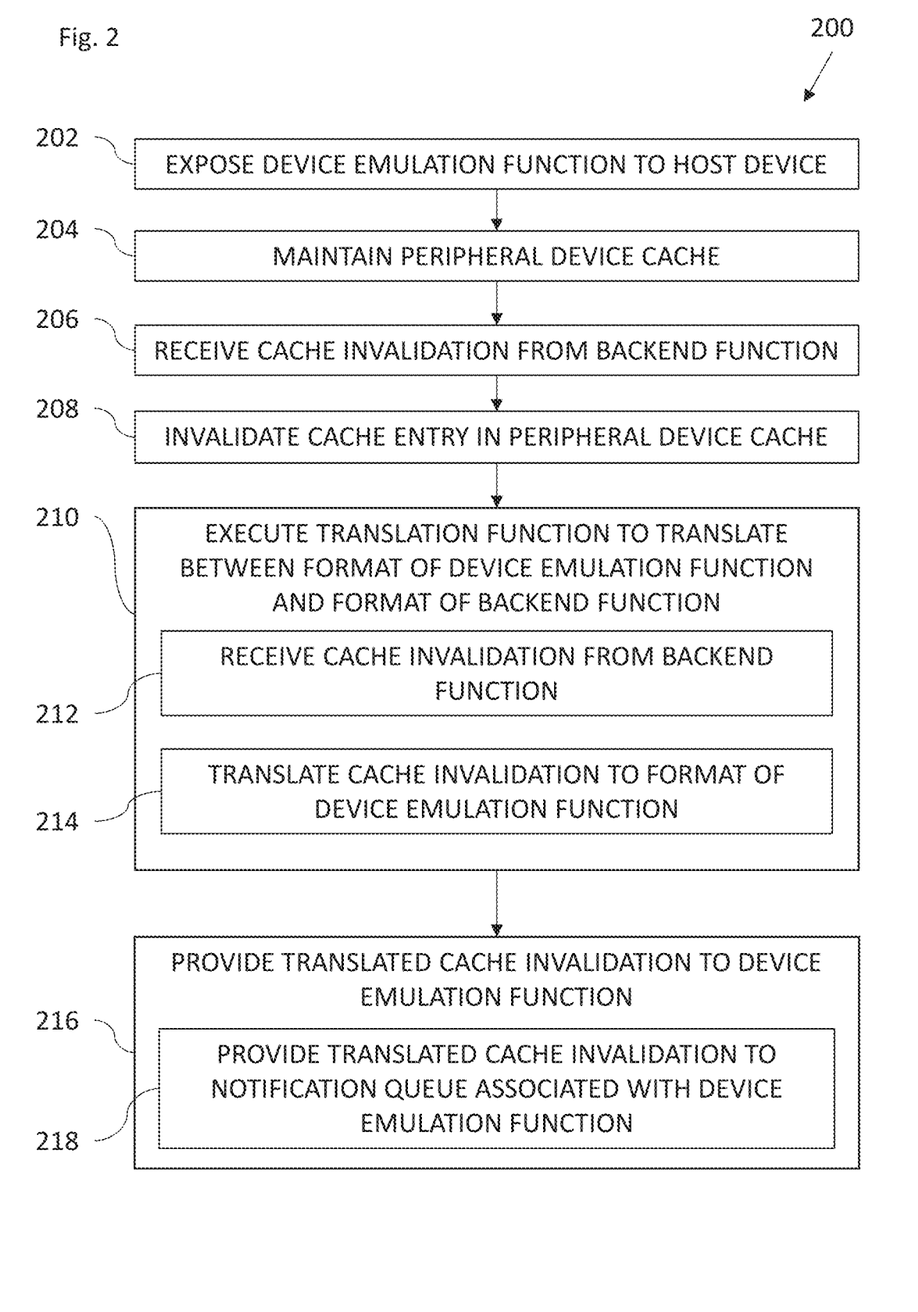
FIG. 2 is a flowchart including steps in a method of operation of one or more processing cores in a peripheral device of the system of FIG. 1.
Figure 3:
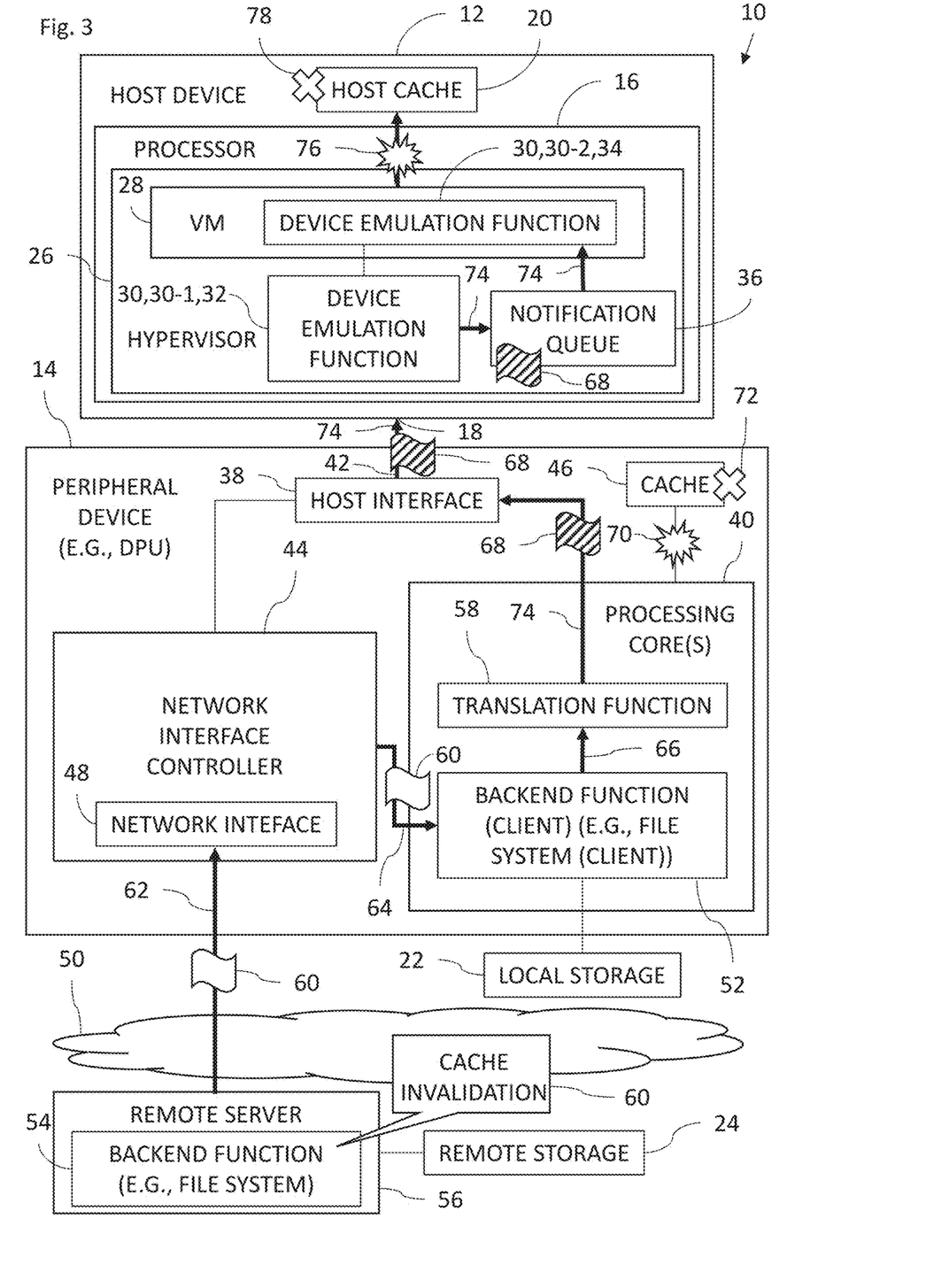
FIG. 3 is a block diagram view of the computer system of FIG. 1 illustrating cache invalidation.

Reference is now made to FIGS. 2 and 3. FIG. 2 is a flowchart 200 including steps in a method of operation of one or more processing cores 40 in peripheral device 14 of the system 10 of FIG. 1. FIG. 3 is a block diagram view of the computer system 10 of FIG. 1 illustrating cache invalidation.

The processing core(s) 40 is configured to expose device emulation function 30 to host device 12 (block 202). The processing core(s) 40 is configured to maintain peripheral device cache 46 (block 204).

The client program being executed by the host device 12 (e.g., by VM 28) may read data from local storage 22 and/or remote storage 24 via the device emulation function 30 which communicates with backend function (client) 52 and optionally backend function 54 to retrieve stored data. The read data may be cached by processing core(s) 40 in peripheral device cache 46, and by processor 16 in host cache 20. If another VM running on host device 12 or another host device writes to the same data, the backend function 52 and/or the backend function 54 (depending on where the data is stored) will generate a cache invalidation 60. When the cache invalidation 60 is generated by backend function 54, backend function 54 is configured to provide (arrow 62) the cache invalidation 60 over network 50 to NIC 44 which provides (arrow 64) the cache invalidation 60 to backend function client 52 running on processing core(s) 40. The backend function (client) 52 provides (arrow 66) the cache invalidation 60 to translation function 58. The invalidation process is now described in more detail.

The processing core(s) 40 is configured to receive cache invalidation 60 (or a command to invalidate a cache entry) from backend function (client) 52 (block 206). The processing core(s) 40 is configured to invalidate (symbol 70) a cache entry 72 in peripheral device cache 46 in response to receiving cache invalidation 60 from backend function 54 or cache invalidation 60 or the command from backend function (client) 52 (block 208).

The processing core(s) 40 is configured to execute translation function 58 to translate between a format of the device emulation function 30 and a format of the backend function 52, 54 (block 210). The step of block 210 may include the translation function 58 being configured to: receive (arrow 66) the cache invalidation 60 from the backend function 52, 54 (block 212); and translate the cache invalidation 60 to the format of the device emulation function 30 (block 214) yielding a translated cache invalidation 68.

The translation function 58 is configured to provide the translated cache invalidation 68 via host interface 38 to the device emulation function 34 (which could be running on VM 28 or on processor 16 without VM 28, i.e., "bare metal") (block 216 and arrows 74). In some embodiments, the translation function 58 is configured to provide the translated cache invalidation 68 to notification queue 36 disposed on the host device 12 (block 218). The device emulation function 34 then retrieves the translated cache invalidation 68 from notification queue 36, as described in more detail with reference to FIG. 4.

In some embodiments, the device emulation function 30 is a file system device emulation function, the backend function 52, 54 is a file system, and the translation function is configured to translate between a format of the file system device emulation function and a format of the file system. The file system may be a local file system, which is executed by the peripheral device 14. Additionally, or alternatively, the file system may be a remote file system, which is executed by remote server 56.

In some embodiments, the device emulation function 30 is a block storage system device emulation function, the backend function is a block storage system, and the translation function is configured to translate between a format of the block storage system device emulation function and a format of the block storage system.

Figure 4:
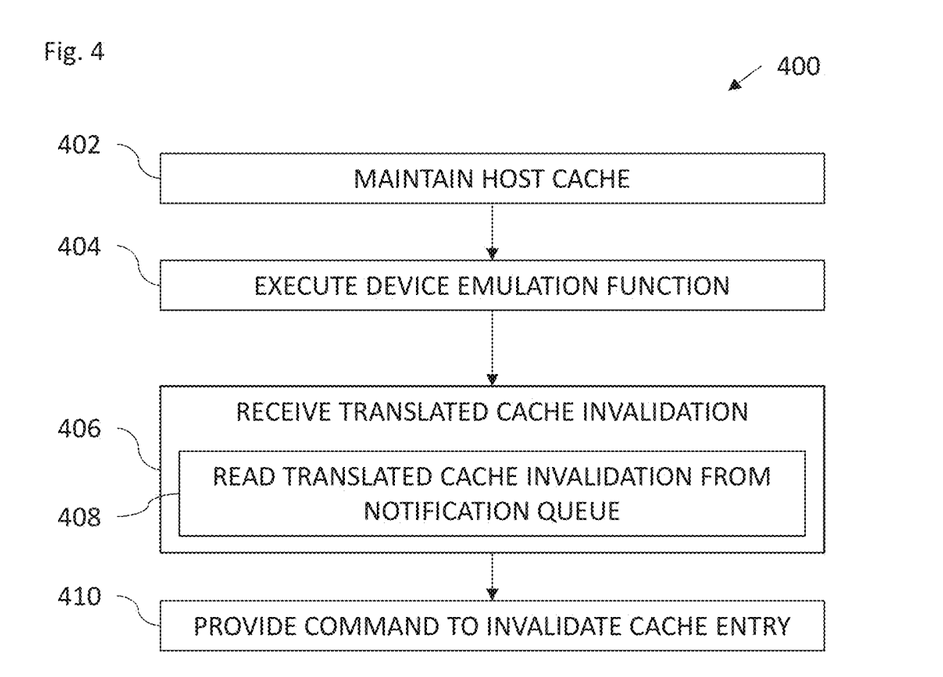
FIG. 4 is a flowchart including steps in a method of operation of a processor of a host device of the system of FIG. 1.

Reference is now made to FIG. 4, which is a flowchart 400 including steps in a method of operation of processor 16 of host device 12 of the system 10 of FIG. 1. Reference is also made to FIG. 3. The processor 16 is configured to maintain host cache 20 (block 402) and execute the device emulation function 30, 32, 34 (block 404). The device emulation function 34 is configured to receive the translated cache invalidation 68 (block 406). In some embodiments, the device emulation function 34 is configured to read the translated cache invalidation 68 from the notification queue 36 (block 408). The device emulation function 34 is configured to generate and provide a command (e.g., to VM 28 or processor 16) to invalidate a cache entry 78 in the host cache 20 based on the received translated cache invalidation (block 410). The VM 28 or the processor 16 is configured to invalidate (symbol 76) cache entry 78 in host cache 20. The device emulation function 34 may receive an acknowledgement of the cache invalidation from processor 16 and provide an acknowledgement of the cache invalidation to the backend function (client) 52 and/or backend function 54, via translation function 58.

Various features of the disclosure which are, for clarity, described in the contexts of separate embodiments may also be provided in combination in a single embodiment. Conversely, various features of the disclosure which are, for brevity, described in the context of a single embodiment may also be provided separately or in any suitable sub-combination.

The embodiments described above are cited by way of example, and the present disclosure is not limited by what has been particularly shown and described hereinabove. Rather the scope of the disclosure includes both combinations and sub-combinations of the various features described hereinabove, as well as variations and modifications thereof which would occur to persons skilled in the art upon reading the foregoing description and which are not disclosed in the prior art.

What is claimed:

1. A device, comprising: a host interface to be connected to a host device via a data communication bus; and at least one processing core to:
    expose a device emulation function to the host device;
    maintain a peripheral device cache;
    invalidate a cache entry in the peripheral device cache in response to receiving a cache invalidation from a backend function; and
    execute a translation function to:
        translate between a format of the device emulation function and a format of the backend function;
        receive the cache invalidation from the backend function;
        translate the received cache invalidation to the format of the device emulation function yielding a translated cache invalidation; and
        provide the translated cache invalidation to the device emulation function being executed by a processor of the host device.

2. The device according to claim 1, wherein:
    the device emulation function is a file system device emulation function;
    the backend function is a file system; and
    the translation function is to translate between a format of the file system device emulation function and a format of the file system.

3. The device according to claim 2, wherein the file system is a local file system, and is executed by the peripheral device.

4. The device according to claim 1, wherein:
    the device emulation function is a block storage system device emulation function;
    the backend function is a block storage system; and
    the translation function is to translate between a format of the block storage system device emulation function and a format of the block storage system.

5. The device according to claim 1, wherein the translation function is to provide the translated cache invalidation to a notification queue disposed on the host device.

6. The device according to claim 1, further comprising a data processing unit (DPU) including the at least one processing core and a network interface controller (NIC).

7. A system, comprising a host device and a peripheral device, the host device including a processor, the peripheral device including: a host interface to be connected to a host device via a data communication bus; and at least one processing core to:
    expose a device emulation function to the host device;
    maintain a peripheral device cache; and
    invalidate a cache entry in the peripheral device cache in response to receiving a cache invalidation from a backend function; and
    execute a translation function to:
        translate between a format of the device emulation function and a format of the backend function;
        receive the cache invalidation from the backend function;
        translate the received cache invalidation to the format of the device emulation function yielding a translated cache invalidation; and
        provide the translated cache invalidation to the device emulation function being executed by the processor of the host device.

8. The system according to claim 7, wherein:
    the device emulation function is a file system device emulation function;
    the backend function is a file system; and
    the translation function is to translate between a format of the file system device emulation function and a format of the file system.

9. The system according to claim 8, wherein the file system is a local file system, and is executed by the peripheral device.

10. The system according to claim 7, wherein:
    the device emulation function is a block storage system device emulation function;
    the backend function is a block storage system; and
    the translation function is to translate between a format of the block storage system device emulation function and a format of the block storage system.

11. The system according to claim 7, wherein:
    the processor is to execute the device emulation function;
    the processor is to maintain a host cache; and
    the device emulation function is to receive the translated cache invalidation and provide a command to invalidate a cache entry in the host cache based on the received translated cache invalidation.

12. The system according to claim 11, wherein the translation function is to provide the translated cache invalidation to a notification queue disposed on the host device, and the device emulation function is to read the translated cache invalidation from the notification queue.

13. The system according to claim 11, wherein:
    the processor of the host device is to execute a hypervisor; and
    the hypervisor is to execute a virtual machine (VM), which is to execute the device emulation function.

14. The system according to claim 11, wherein:
    the device emulation function is a file system device emulation function;
    the backend function is a file system; and
    the translation function is to translate between a format of the file system device emulation function and a format of the file system.

15. The system according to claim 7, wherein the peripheral device includes a data processing unit (DPU), including the at least one processing core and a network interface controller (NIC).

16. A method, comprising:
exposing a device emulation function to a host device;
maintaining a peripheral device cache;
invalidating a cache entry in the peripheral device cache in response to receiving a cache invalidation from a backend function;
translating between a format of the device emulation function and a format of the backend function;
receiving the cache invalidation from the backend function;
translating the received cache invalidation to the format of the device emulation function yielding a translated cache invalidation; and
providing the translated cache invalidation to the device emulation function being executed by a processor of the host device.

17. The method according to claim 16, wherein:
the device emulation function is a file system device emulation function;
the backend function is a file system; and
the method further comprises translating between a format of the file system device emulation function and a format of the file system.

18. The method according to claim 16, wherein:
the device emulation function is a block storage system device emulation function;
the backend function is a block storage system; and
the method further comprises translating between a format of the block storage system device emulation function and a format of the block storage system.

19. The method according to claim 16, further comprising:
executing the device emulation function in the host device;
maintaining a host cache;
receiving the translated cache invalidation; and
providing a command to invalidate a cache entry in the host cache based on the received translated cache invalidation.

20. The method according to claim 19, further comprising:
providing the translated cache invalidation to a notification queue disposed on the host device; and
reading the translated cache invalidation from the notification queue.

* * * * *